Oct. 23, 1945.   G. R. CUNNINGTON   2,387,317
TRIM PANEL
Filed Feb. 24, 1941   2 Sheets-Sheet 1
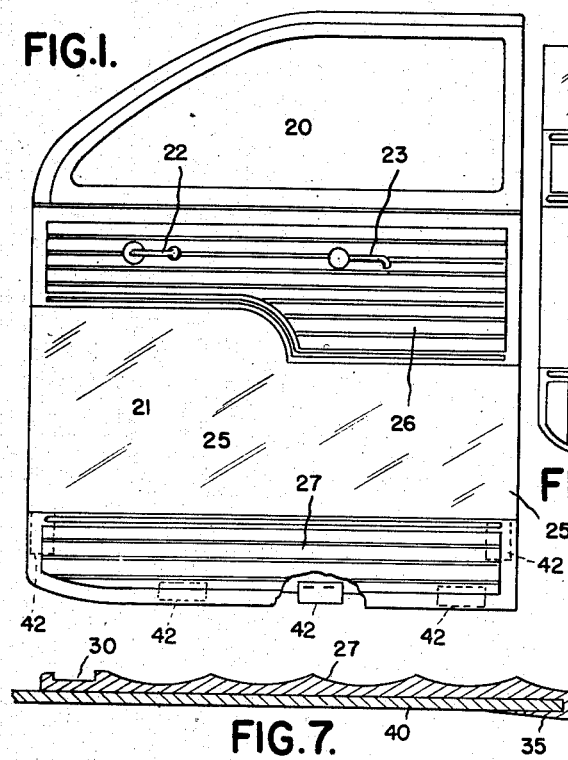
FIG.1.
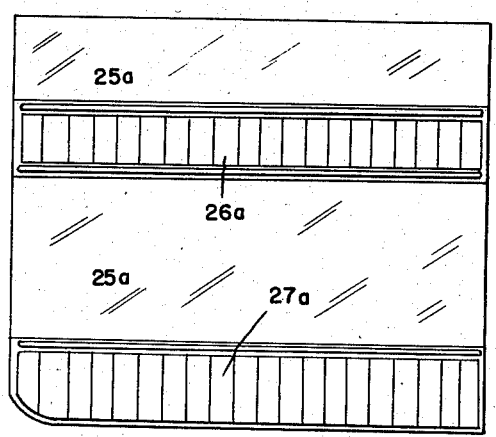
FIG.2.
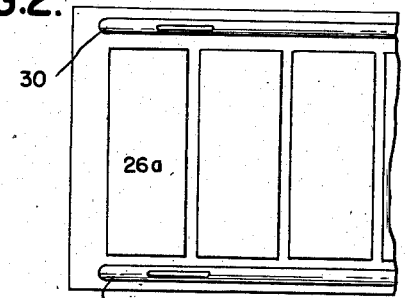
FIG.3.
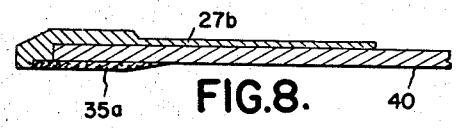
FIG.7.
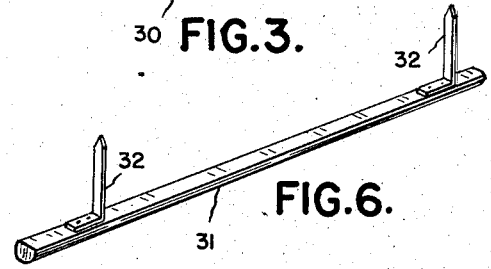
FIG.6.
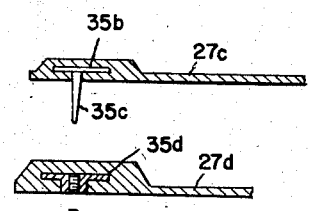
FIG.8.
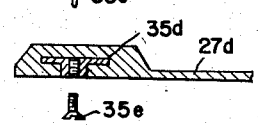
FIG.9.
FIG.10.
FIG.5.
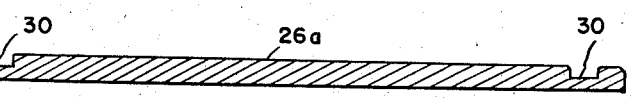
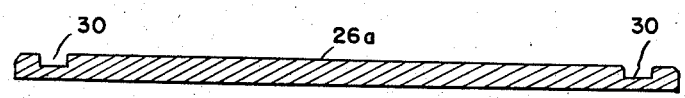
FIG.4.
INVENTOR.
GEORGE R. CUNNINGTON
BY Swan, Frye, & Hardisty
ATTORNEYS

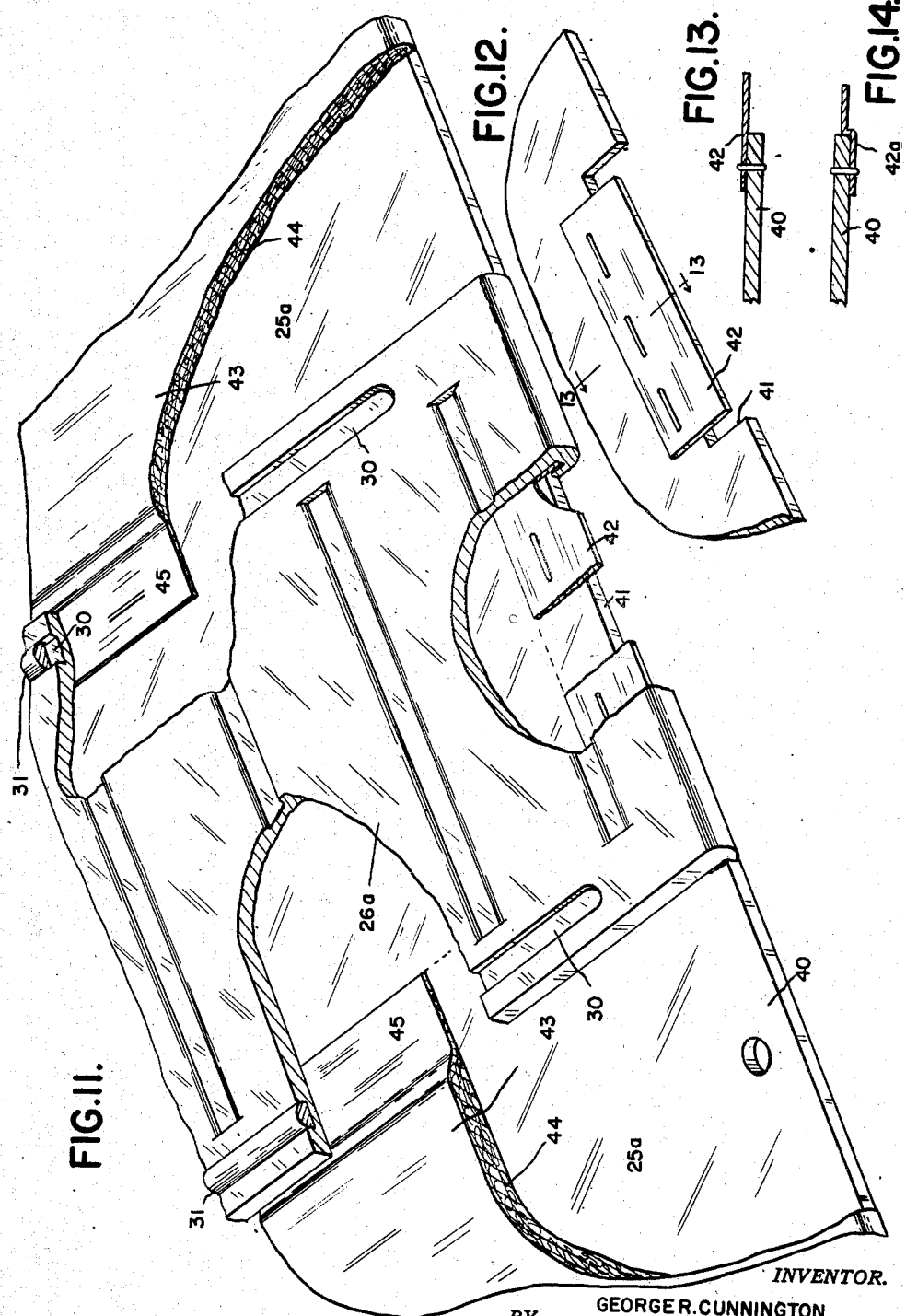

Patented Oct. 23, 1945

2,387,317

UNITED STATES PATENT OFFICE 2,387,317

TRIM PANEL

George R. Cunnington, Grosse Pointe Farms, Mich.

Application February 24, 1941, Serial No. 380,155

1 Claim. (Cl. 45—138)

The present invention relates to trim panels for the interior of automotive vehicles particularly the doors thereof and to methods of fabricating such panels.

In automobile door constructions, those portions of the door which are subjected to the most wear and to influences tending to soil their surfaces, are the areas adjacent the operating handles and along the lower edge.

Further, in the most commonly used trim panels, these areas are covered with cloth secured to a foundation board treated to increase its moisture resistance, and it not infrequently happens that attempts to clean the cloth result in bringing into the cloth some of the treating material and producing stains. And even without such staining effect, cleaning often results in displacing the nap of the cloth with consequent apparent discoloration.

Among the objects of the present invention is a trim panel in which those parts subjected to the greatest effects tending toward soiling, destruction or marring, may, when necessary or desirable, be easily and quickly replaced.

Another object is a panel which may be more easily and efficiently cleaned and restored to its original fresh appearance.

Another object is a panel in which may be used, as a foundation, material which in the usual trim panel offers certain very definite objections, but which, in the present panel, has none.

Another object of the invention is a panel which possesses flexibility of design and which is relatively inexpensive and simple in fabrication.

Other objects and advantages will be apparent to those skilled in the art upon reference to the following description and the accompanying drawings in which Figure 1 is an inside elevation of an automobile door showing the trim panel in place.

Figure 2 is a similar view of a slightly different panel adapted to be fixed to a door or other portion of the automobile interior.

Figure 3 is an elevation of a portion of one of the elements of the panel of Figure 2.

Figures 4 to 10 show certain details of construction.

Figure 11 is an enlarged perspective showing the method of producing a panel.

Figure 12 is a perspective view of a part of the structure shown in Figure 11.

Figure 13 is a section on the line 13—13 of Figure 12, and

Figure 14 is a similar section showing a slight modification of the structure in Figure 13.

In the drawings, Figure 1 shows the inner face of an automobile door constructed in the conventional manner with an upper glass window panel 20, and having that portion below the window faced with a prefabricated trim panel designated as a whole at 21. Suitable handles 22 and 23 are provided for window and door operation and these extend through suitable openings in the trim panel.

The trim panel shown, however, constitutes an embodiment of one aspect of the present invention and consists broadly of a foundation board covered with a suitable cloth at its intermediate portion 25, the upper and lower edges of which, and the remainder of the foundation board, are covered by molded decorative panels 26 and 27.

In the form of trim panel shown in Figure 2, the areas covered with cloth are indicated at 25a while the decorative panels are indicated at 26a and 27a.

In the specific description of the decorative panels which follows, the form chosen is the simple rectangular panel shown in Figure 2, although it is proposed to make such panels in any shape or with any molded decorative surface that may be desirable for any particular door.

Referring now to, for example, the panel 26a, this consists of a relatively thin member molded of a suitable material, which may be any non-metallic moldable material capable of taking a fine line design and having to a considerable degree the qualities of toughness, resistance to abrasion and moisture, and which does not soften or become brittle under heat conditions to which such panels are subjected in use. Certain rubber base materials are quite satisfactory and have been used for the purpose.

Near the longer edges of the panel 26a it is preferred to mold or otherwise provide grooves 30, (see Fig. 4 which is a section of panel 26a on line 4—4 of Fig. 3), extending to near the ends, in which is placed a strip of metal molding 31 such as is shown in Figure 6. This molding 31 is provided with tongues 32 adapted to pierce the panel and foundation board and be bent over or clinched to hold the panel 26a in place, the outer face of the molding lying substantially in the plane of the outer face of the panel or slightly above.

In panels such as 27 and 27a intended to be placed along the bottom or other edge of the trim panel, only one groove 30 need be provided since it is preferred to secure the other edge of the panel to the edge of the foundation board by such means as is indicated in Figures 5 and 7 to 10.

In Figures 5 and 7, the panels 27 and 27a are indicated as being provided with a spaced backwardly projecting integral flange 35 adapted to be hooked over the corresponding edge of the foundation board 40, while in Figure 8 a similar flange 35a is provided by securing to the panel a strip of suitable cloth. If a rubber composition is used for the panel this cloth strip may be secured by vulcanization.

In Figure 9 a metal strip 35b carrying prongs 35c is indicated as molded in the edge of the panel while in Figure 10, a metal strip 35d with threaded nut portions may be molded into the panel edge and the panel secured by screws 35e.

The preferred method of fabricating a trim panel is shown in Figures 11 to 14.

In these figures a suitable foundation board is indicated at 40 and this may be of any material having the desired stiffness, workability, moisture resistance, etc. This is first provided with a suitable cut away portion or portions 41 and a thin metal or other plate 42 secured thereto in such manner as to project into the notch to a line somewhat inside of the edge line of board 40, the position of the plate edge being determined by the thickness of the overhanging edge of the decorative panel 26a.

As indicated in Figure 1, a similar method of securing the panel edge may be used at the bottom of the foundation board. Instead of hooking the panel over the edge of the board, the edge may be cut back and plates 42 affixed at intervals.

The cloth 43 is then applied to the intermediate areas 25a of the board 40, a suitable padding material 44 being usually employed. The edges 45 of the cloth should extend a short distance above or below, as the case may be, the padded portion, and be secured by stapling or adhesive or both.

The decorative panel 26a is then applied by hooking its edge over the plate 42 and then adding the securing molding in the groove or grooves 30. The trim panel is then ready for application to a door or other part of the automobile body.

As indicated in Figures 13 and 14, the plate 42 may be applied to the outer face of board 40 as in Figure 13 or the under face. In Figure 14, the plate 42a is applied to the under face of board 40 and is bent as indicated to bring its outer edge substantially into the plane of the upper face of board 40.

The above described panel construction lends itself readily to a novel method of production which is briefly as follows:

A foundation board of suitable shape is first cut and its lateral and bottom edges cut away as indicated in Figures 1 and 11. The securing plates 42 are then fixed in the lateral recesses and at suitable intervals along the bottom. Suitable adhesive is then applied to the board in such areas as may be required to hold the padding 44 and cloth 43. These latter may then be applied from rolls or strips of the proper width, it is not necessary to pre-cut shaped pieces.

After the application of the cloth 43, the panels 26 and 27 are affixed by hooking thin flanges over the plates 42 and adding the moldings 31 and clinching the tongues 32. The trim panel is then ready for use.

Now having described the invention and the preferred embodiments thereof, it is to be understood that the invention is to be limited, not by the specific details herein set forth, but only by the scope of the claim which follows:

I claim:

A decorative and protective panel for the interior trim of a vehicle, said panel consisting of a molded member provided with a groove adjacent at least one of its edges and fastening means for said panel lying in said groove with its outer face slightly above the face of said member, said fastening means having parts extending through openings in said panel whereby to fix the latter to a support.

GEORGE R. CUNNINGTON.